(12) United States Patent
Chen

(10) Patent No.: US 8,380,919 B2
(45) Date of Patent: Feb. 19, 2013

(54) FLASH STORAGE DEVICE, DATA STORAGE SYSTEM, AND DATA WRITING METHOD

(75) Inventor: I-Pao Chen, Taipei County (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 352 days.

(21) Appl. No.: 12/765,060

(22) Filed: Apr. 22, 2010

(65) Prior Publication Data

US 2011/0125955 A1 May 26, 2011

(30) Foreign Application Priority Data

Nov. 25, 2009 (TW) .............................. 98140070 A

(51) Int. Cl.
*G11C 16/04* (2006.01)
*G06F 12/00* (2006.01)

(52) U.S. Cl. ........... 711/103; 365/185.33; 711/E13.001; 711/E12.012

(58) Field of Classification Search ............. 365/185.33; 711/103, E12.001, E12.008
See application file for complete search history.

(56) References Cited

U.S. PATENT DOCUMENTS

| | | | | |
|---|---|---|---|---|
| 7,831,764 B2 * | 11/2010 | Nakajima et al. | ............ | 711/103 |
| 2006/0015676 A1 * | 1/2006 | Oribe et al. | .................... | 711/103 |
| 2010/0325345 A1 * | 12/2010 | Ohno et al. | ................... | 711/103 |

* cited by examiner

*Primary Examiner* — Yaima Campos
*Assistant Examiner* — Mehdi Namazi
(74) *Attorney, Agent, or Firm* — McClure, Qualey & Rodack, LLP

(57) ABSTRACT

The invention provides a flash storage device. In one embodiment, the flash storage device comprises a flash memory and a controller. The flash memory comprises a plurality of storage units for data storage, wherein the total capacity of each of the storage units is equal to a storage unit capacity. When the flash storage device receives a read capacity command from a host, the controller determines the size of a logical block to be a specific multiple of the storage unit capacity, and sends information about the logical block size to the host in response to the read capacity command, wherein the specific multiple is a natural number. After the host receives the information from the flash storage device, the host retrieves the logical block size from the information, and sends only write data with an amount equal to a multiple of the logical block size to the flash storage device.

20 Claims, 6 Drawing Sheets

| Byte \ Bit | 7 | 6 | 5 | 4 | 3 | 2 | 1 | 0 |
|---|---|---|---|---|---|---|---|---|
| 0 | \multicolumn{8}{c|}{Command Code (25h)} |||||||| 
| 1 | Logical Unit Number ||| Reserved |||| RelAdr |
| 2 | (MSB) |||||||| 
| 3 | \multicolumn{8}{c|}{Logical Block Address} |||||||| 
| 4 | |||||||| |
| 5 | |||||||(LSB)| |
| 6 | Reserved |||||||| |
| 7 | Reserved |||||||| |
| 8 | Reserved ||||||| PMI |
| 9 | Reserved |||||||| |
| 10 | Reserved |||||||| |
| 11 | Reserved |||||||| |

FIG. 3A

| Byte \ Bit | 7 | 6 | 5 | 4 | 3 | 2 | 1 | 0 |
|---|---|---|---|---|---|---|---|---|
| 0 | (MSB) |||||||| |
| 1 | \multicolumn{8}{c|}{Logical Block Number} |||||||| 
| 2 | |||||||| |
| 3 | |||||||(LSB)| |
| 4 | (MSB) |||||||| |
| 5 | \multicolumn{8}{c|}{Logical Block Size (Byte)} |||||||| 
| 6 | |||||||| |
| 7 | |||||||(LSB)| |

FIG. 3B

FLASH STORAGE DEVICE, DATA STORAGE SYSTEM, AND DATA WRITING METHOD

CROSS REFERENCE TO RELATED APPLICATIONS

This application claims priority of Taiwan Patent Application No. 98140070, filed on Nov. 25, 2009, the entirety of which is incorporated by reference herein.

BACKGROUND OF THE INVENTION

1. Field of the Invention

The invention relates to flash memories, and more particularly to a data writing method of flash memories.

2. Description of the Related Art

A flash memory comprises a plurality of blocks, and each of the blocks comprises a plurality of pages for data storage. A flash memory writes data in a unit of a page, and erases data in a unit of a block. In other words, the flash memory can respectively write data to a plurality of pages, but data cannot be respectively erased from each of the pages. After the flash memory erases data from all pages of a block, the flash memory can then, again, write data to the pages of the block. Because a block comprises a plurality of pages, erasing data from a block requires a long period of time. A flash memory therefore cannot erase data in a high frequency; otherwise, delay is caused, which lower performance of the flash memory.

To reduce space occupied by data in a flash memory, the controller fills as much data as possible to a specific page of the flash memory when writing data. If the amount of the data is less than the capacity of the specific page, the controller stores the data in a buffer and waits for subsequent data transmitted from a host. After the buffer stores data with an amount equal to the capacity of the specific page, the controller then writes the data stored in the buffer to the specific page. However, the buffering operation causes a delay in execution of write commands sent from the host and is an extra burden on the controller.

Referring to FIG. 1, a flowchart of a conventional method 100 for writing data to a flash memory is shown. A host first transmits data to a flash storage device (step 102). The flash storage device then receives data from the host (step 104). A controller of the flash storage device then determines whether the amount of the received data is equal to a multiple of a page of a flash memory of the flash storage device (step 106). When the amount of the received data is equal to a multiple of a page, the controller directly writes the received data to a plurality of pages of the flash memory (step 118). When the amount of the received data is not equal to a multiple of a page, the controller separates the received data into a plurality of page data segments and remnant data, wherein the amount of each of the page data segments is equal to a the capacity of the page, and the amount of the remnant data is less than the capacity of the page (step 107). The controller then stores the remnant data in a buffer (step 108), and writes the page data segments to a plurality of pages of the flash memory (step 110). The flash storage device then receives subsequent data from the host and stores the subsequent data to the buffer (step 112) until the amount of data stored in the buffer equals to the capacity of a page of the flash memory (step 114). Finally, the controller writes data stored in the buffer to a page of the flash memory (step 116).

Because a host generally does not transmit write data with an amount equal to a multiple of the capacity of a page of a flash memory, when a flash storage device receives write data from the host, and the controller of the flash storage device must repeatedly buffer remnant data of the write data until the buffer stores data with an amount equal to the capacity of a page. Execution of write operations sent from the host is therefore delayed, thus negatively impacting performance of the flash storage device. A method for writing data to the flash storage device is therefore required to improve efficiency of data writing operations.

BRIEF SUMMARY OF THE INVENTION

The invention provides a flash storage device. In one embodiment, the flash storage device is coupled to a host, and comprises a flash memory and a controller. The flash memory comprises a plurality of storage units for data storage, wherein the total capacity of each of the storage units is equal to a storage unit capacity. When the flash storage device receives a read capacity command from the host, the controller determines the size of a logical block to be a specific multiple of the storage unit capacity, and sends information about the logical block size to the host in response to the read capacity command, wherein the specific multiple is a natural number. After the host receives the information from the flash storage device, the host retrieves the logical block size from the information, and sends only write data with an amount equal to a multiple of the logical block size to the flash storage device.

The invention provides a data storage system. In one embodiment, the data storage device comprises a flash storage device and a host. The flash storage device comprises a flash memory for data storage. When the flash storage device receives a read capacity command from a host, the flash storage device determines the size of a logical block to be a specific multiple of a storage unit capacity of the flash memory, and sends information about the logical block size to the host in response to the read capacity command, wherein the specific multiple is a natural number, the flash memory comprises a plurality of storage units for data storage, and capacity of each of the storage units is equal to a the storage unit capacity. The host sends the read capacity command to the flash storage device, retrieves the logical block size from the information, and sends only write data with an amount equal to a multiple of the logical block size to the flash storage device.

The invention provides a data writing method of a data storage system. In one embodiment, the data storage system comprises a host and a flash storage device, the flash storage device comprises a flash memory comprising a plurality of storage units for data storage, and the total capacity of each of the storage units is equal to a storage unit capacity. First, a read capacity command is sent by the host to the flash storage device. When the flash storage device receives the read capacity command from the host, the flash storage device determines the size of a logical block to be a specific multiple of the storage unit capacity, wherein the specific multiple is a natural number. Information about the logical block size is then sent by the flash storage device to the host in response to the read capacity command. After the host receives the information from the flash storage device, the logical block size is retrieved by the host from the information. Finally, only write data with an amount equal to a multiple of the logical block size is sent by the host to the flash storage device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3A shows a format of a read command capacity;

FIG. 3B shows a format of response information of the read capacity command;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
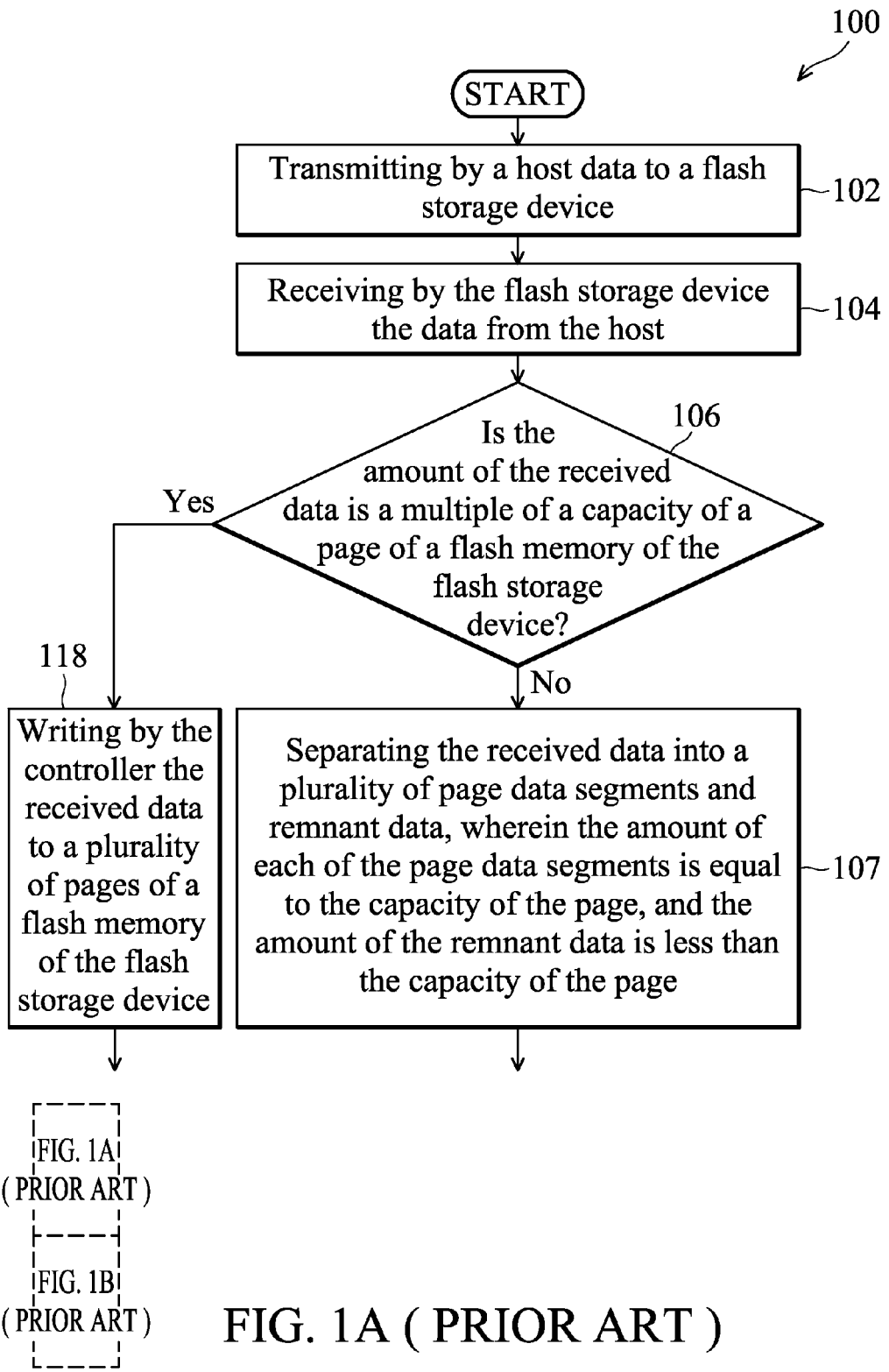
FIG. 1 is a flowchart of a conventional method for writing data to a flash memory.
Figure 1B:
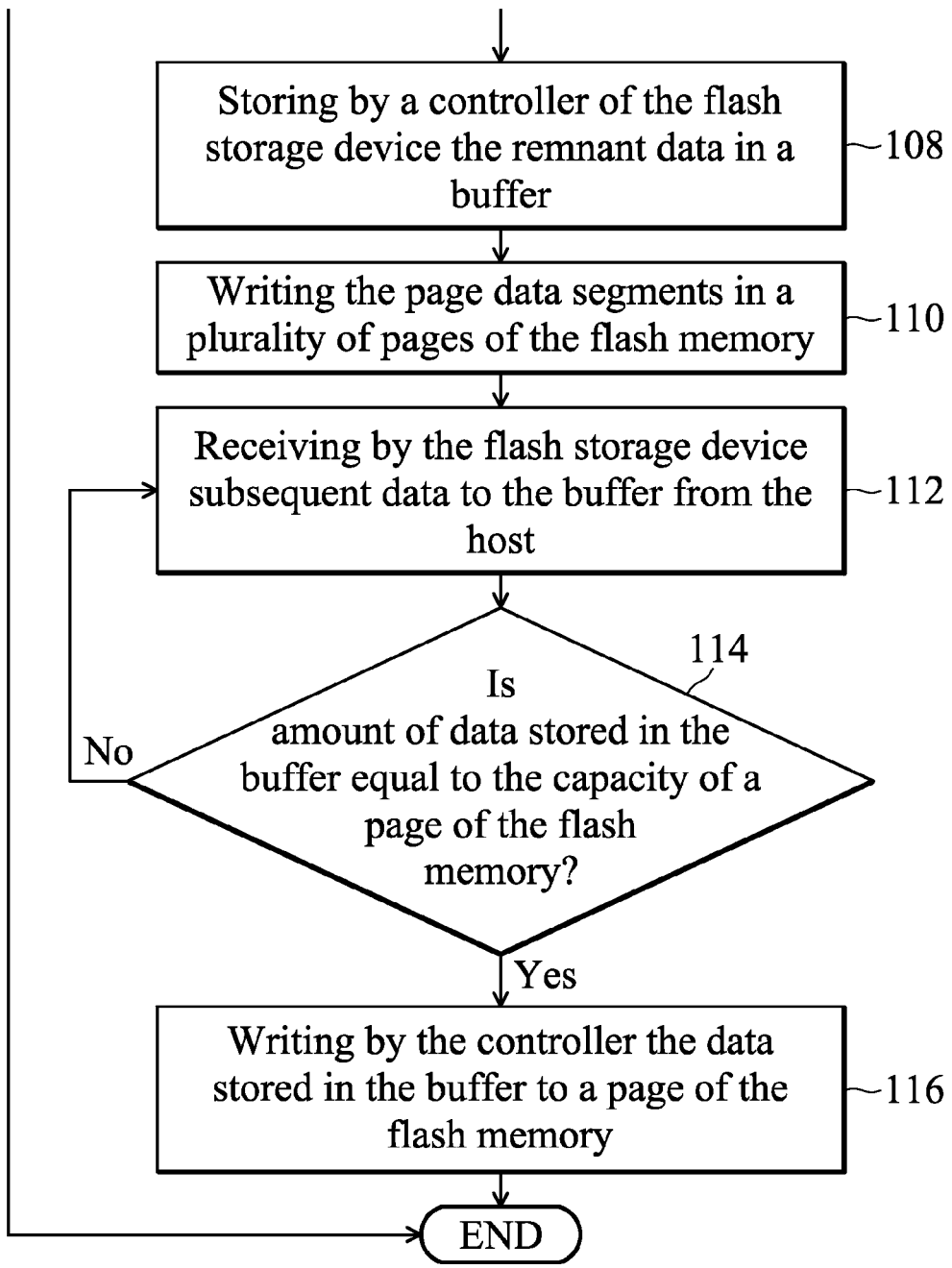
Figure 2:
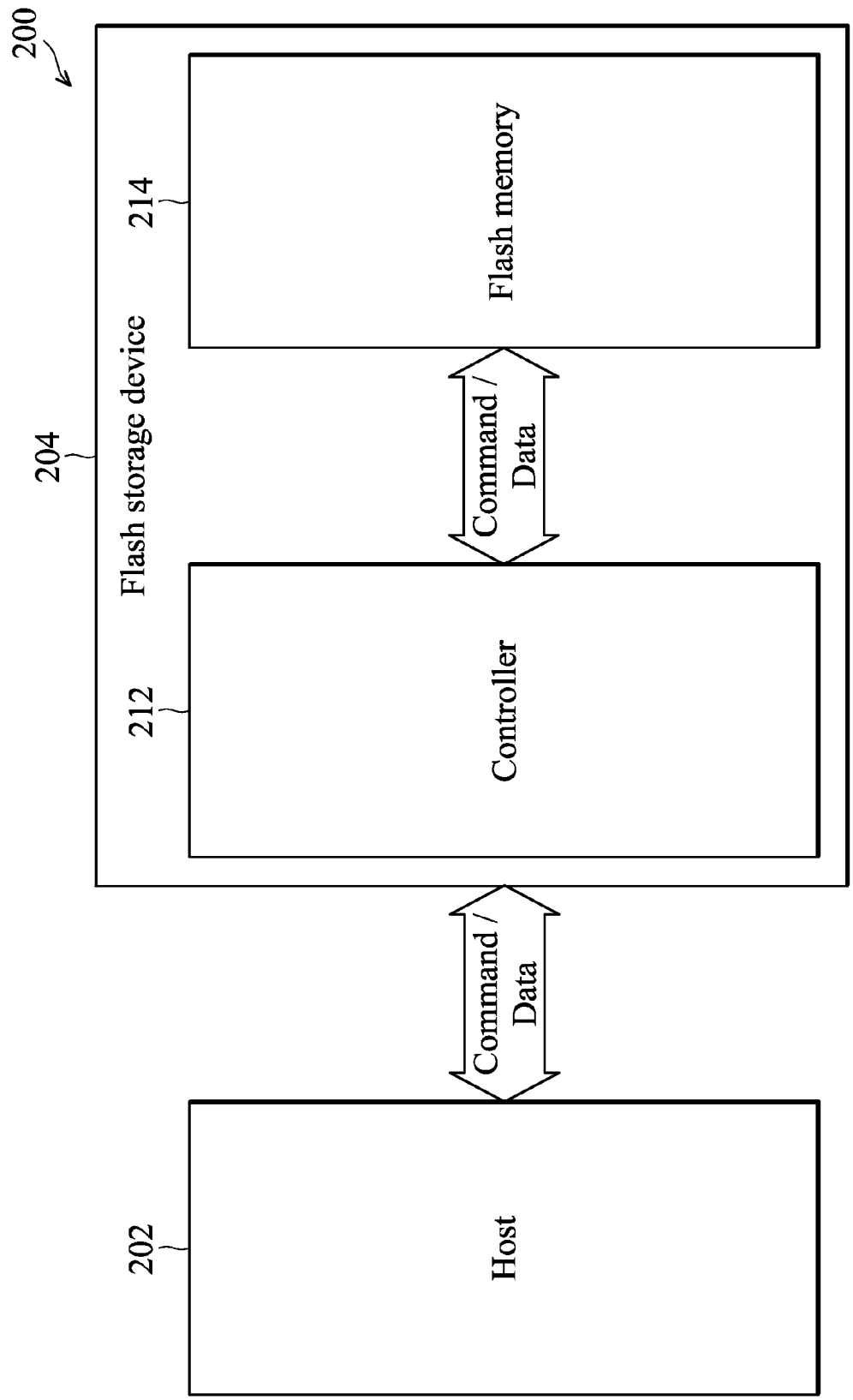
FIG. 2 is a block diagram of a data storage system according to an embodiment of the invention.

Referring to FIG. 2, a block diagram of a data storage system 200 according to an embodiment of the invention is shown. The data storage system 200 comprises a host 202 and a flash storage device 204. The flash storage device 204 stores data for the host 202. In one embodiment, the flash storage device 204 comprises a controller 212 and a flash memory 214. The flash memory 214 comprises a plurality of storage units for data storage, and the total capacity of each of the storage units is equal to a storage unit capacity. In one embodiment, after a storage unit of the flash memory 214 stores data, the controller 212 cannot write data to the storage unit again, until data is removed from the storage unit. In the embodiment, the storage unit is a page of the flash memory 214. The controller 212 then accesses data stored in the flash memory 214 according to the commands sent from the host 202.

In one embodiment, the flash storage device 204 is connected to the host 202 via a universal serial bus (USB) interface, and the controller 212 and the host 202 supports a small computer system interface (SCSI) communication protocol. The SCSI communication protocol comprises a read capacity command with a command code 0x25. When the flash storage device 204 is coupled to the host 202, the host 202 sends the read capacity command to the flash storage device 204 to inquire about data capacity of the flash storage device 204. FIG. 3A shows a format of a read command capacity.

When the controller 212 of the flash storage device 204 receives a read capacity command from the host 202, the controller 212 detects data capacity of the flash memory 214, and then sends information about the data capacity to the host 202 in response to the read capacity command. Referring to FIG. 3B, a format of response information of the read capacity command is shown. The response information comprises two 4-byte data segments respectively indicating a logical block number and a logical block size. The logical block size is a value indicating the number of bytes contained by each logical block of the flash memory 214. In one embodiment, the logical block number is equal to 2048 bytes, which is a data capacity of 4 sectors. In one embodiment, the logical block number is equal to 4096 bytes, which is a data capacity of 8 sectors. The logical block number is a value indicating the number of logical blocks contained by the flash memory 214. When the host 202 receives the response information of the read capacity command from the flash storage device 204, the host 202 multiplies the logical block size by the logical block number to obtain total data capacity of the flash memory 214.

After the host 202 receives information about the logical block size from the flash storage device 204, the host 202 only sends write data with an amount equal to a multiple of the logical block size to the flash storage device 204. Thus, if the flash storage device 204 appropriately determines the value of the logical block size to be capacity of a storage unit of the flash memory 214, the host 202 will send write data, with an amount equal to a multiple of the storage unit capacity, to the flash storage device 204. Thus, when the flash storage unit 204 receives write data with an amount equal to a multiple of the storage unit capacity, the controller 212 directly writes the write data to a plurality of storage units without buffering remnant portions of the write data in a buffer. No delay is therefore caused in execution of write commands sent from the host 202, and the performance of the flash storage device 204 is therefore improved.

Figure 4:
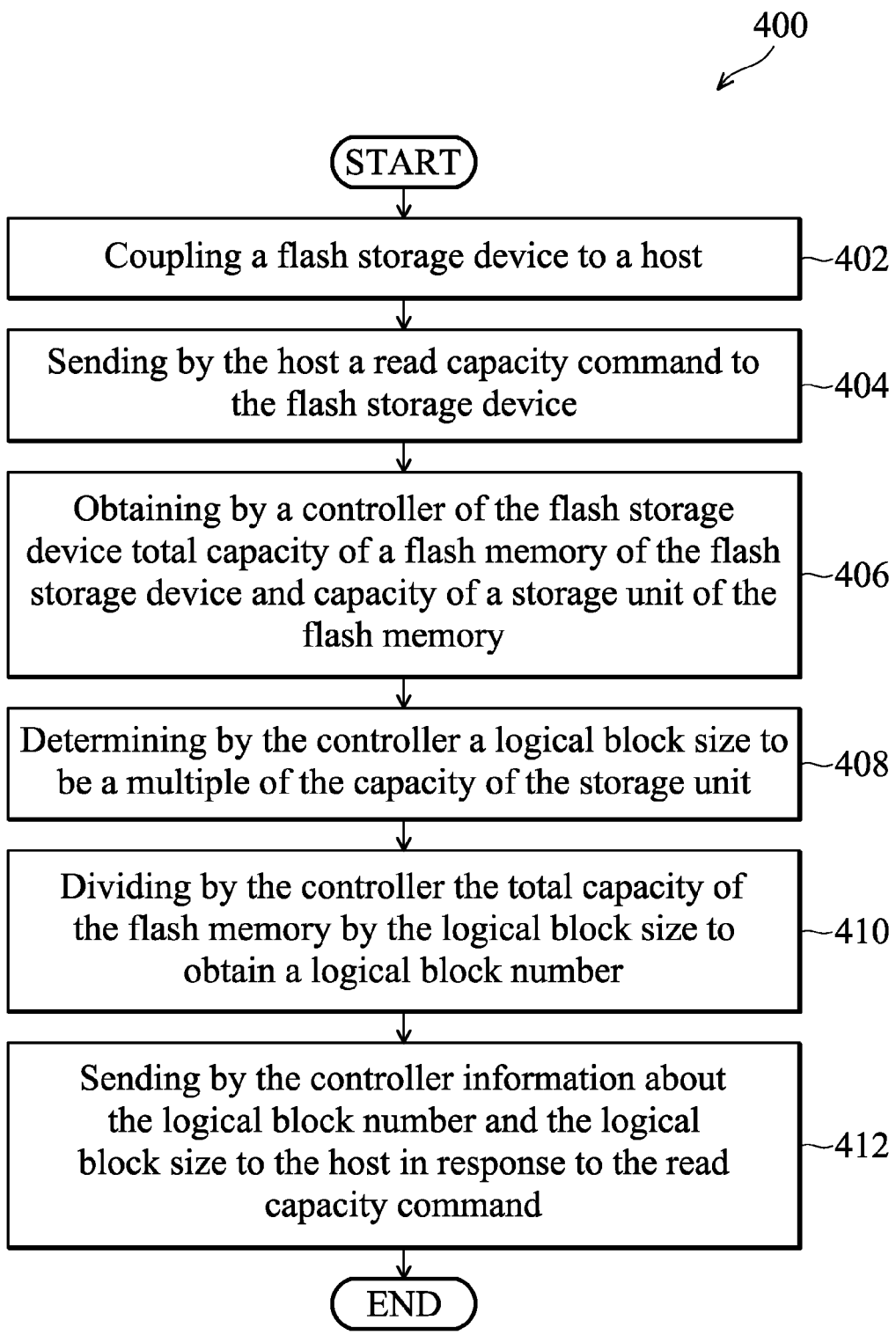
FIG. 4 is a flowchart of a method for transmitting a read capacity command and a response between a host and a flash storage device according to the invention.

Referring to FIG. 4, a flowchart of a method 400 for transmitting a read capacity command and a response between the host 202 and the flash storage device 204 according to the invention is shown. First, the flash storage device 204 is coupled to the host 202 (step 402). The host 202 then sends a read capacity command to the flash storage device 204 (step 404). The controller 212 of the flash storage device 204 then obtains total capacity of the flash memory 214 of the flash storage device 204 and capacity of a storage unit of the flash memory 214 (step 406). In one embodiment, the capacity of the storage unit is equal to a capacity of a page of the flash memory 214. The controller 212 then determines the size of a logical block to be a specific multiple of the capacity of the storage unit, wherein the specific multiple is a natural number (step 408).

The controller 212 then divides total capacity of the flash memory 214 by the logical block size to obtain a logical block number (step 410). The controller 212 then sends information about the logical block size and the logical block number to the host 202, in response to the read capacity command (step 412). After the host 202 receives the information, the host 202 sends write data with an amount equal to a multiple of the logical block size to the controller 212. Because the logical block size is a specific multiple of the storage unit capacity, the amount of the write data is therefore also a multiple of the storage unit capacity and can be directly written into a plurality of storage units of the flash memory 214. The controller 212 therefore does not need to buffer remnant portions of the write data as the conventional method 100, thereby reducing delay caused during the execution of write commands and improving the performance of the flash storage device 204.

In one embodiment, the storage unit of the flash memory 214 is a page of the flash memory 214. The controller 212 may determine the logical block size to be a different multiple of the page according to a flash memory 214 type. For example, a memory cell of a single-level-cell (SLC) flash memory stores 1-bit data. When the flash memory 214 is a SLC flash memory, the controller 212 determines the logical block size to be equal to a capacity of a page of the flash memory. A memory cell of a multiple-level-cell (MLC) flash memory stores 2-bit data. When the flash memory 214 is an MLC flash memory, the controller 212 determines the logical block size to be equal to a capacity of two pages of the flash memory 214. A memory cell of a triple-level-cell (TLC) flash memory stores 3-bit data. When the flash memory 214 is a TLC flash memory, the controller 212 determines the logical block size to be equal to a capacity of three pages of the flash memory 214.

Figure 5:
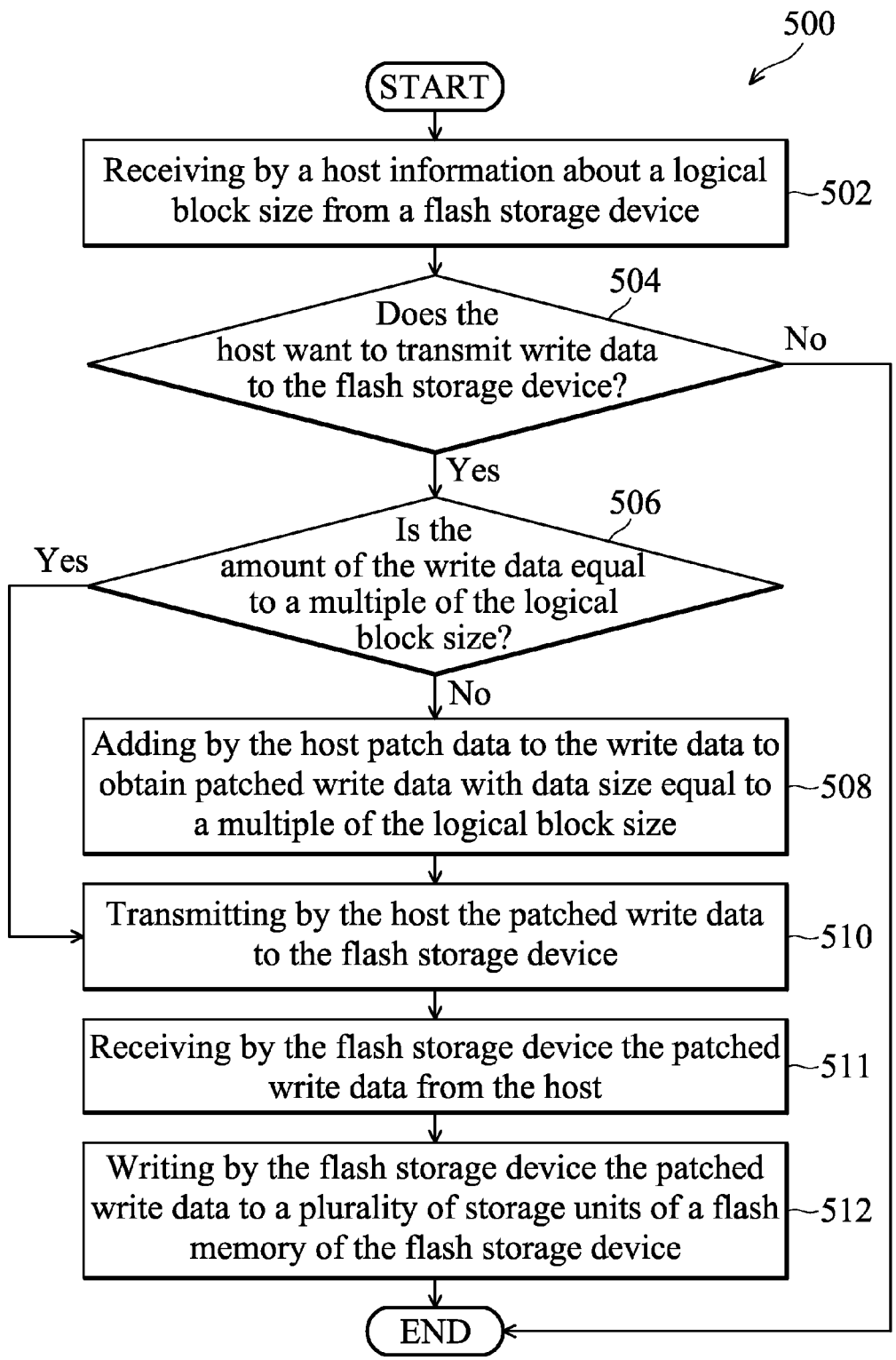
FIG. 5 is a flowchart of a method for writing data into the flash storage device according to the invention.

Referring to FIG. 5, a flowchart of a method 500 for writing data into the flash storage device 204 according to the invention is shown. First, the host 202 receives response information of a read capacity command from the flash storage device 204 (step 502), and obtains the logical block size from the response information. When the host 504 wants to transmit write data to the flash storage device 204 (step 504), the host 202 determines whether the amount of write data is equal to a multiple of the logical block size (step 506). When the amount of the write data is equal to a multiple of the logical block size, the controller 212 directly transmits the write data to the flash storage device 204 (step 510). When the amount of the write data is not equal to a multiple of the logical block size (step 506), the host 202 adds patch data to the write data to obtain patched write data with an amount equal to a multiple of the logical block size (step 508), and then sends the patched write data to the flash storage device 204 (step 510).

In one embodiment, when the amount of the write data is not equal to a multiple of the logical block size (step 506), the host 202 adds patch data containing bits 0 to the write data to obtain patched write data with an amount equal to a multiple of the logical block size (step 508). Thus, the amount of the patched write data is always a multiple of the capacity of a storage unit. The flash storage device 204 receives the patched write data from the host 202 (step 511), and directly writes the patched write data to a plurality of storage units of the flash memory 214 (step 512). In other words, the controller 212 divides the patched write data into a plurality of write data segments to be respectively written into the storage units. The controller 212 therefore does not buffer remnant portion of the patched write data sent from the host 202, thus shortening the time period needed for writing data into the flash storage unit 204 and improving the performance of the flash storage device 204.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flash storage device, coupled to a host, comprising:
a flash memory, comprising a plurality of storage units for data storage, wherein the total capacity of each of the storage units is equal to a storage unit capacity;
a controller, when the flash storage device receives a read capacity command from the host, determining a size of a logical block to be a specific multiple of the storage unit capacity, and sending information about the logical block size to the host in response to the read capacity command, wherein the specific multiple is a natural number;
wherein after the host receives the information from the flash storage device, the host retrieves the logical block size from the information, and sends only write data with an amount equal to a multiple of the logical block size to the flash storage device.

2. The flash storage device as claimed in claim 1, wherein when the flash storage device receives the write data from the host, the controller divides the write data into a plurality of storage unit segments with a total amount of data equal to the storage unit capacity, and writes the storage unit segments into the storage units of the flash memory.

3. The flash storage device as claimed in claim 1, wherein when a first storage unit selected from the storage units has data stored therein, the flash memory cannot write data to the first storage unit until after data is removed from the first storage unit.

4. The flash storage device as claimed in claim 1, wherein when the flash storage device receives the read capacity command from the host, the controller further obtains information about a total capacity of the flash memory, divides the total capacity by the storage unit capacity to obtain a logical block number, and sends the logical block number to the host in addition to the logical block size, in response to the read capacity command.

5. The flash storage device as claimed in claim 1, wherein before the host sends the write data, the host determines whether the amount of the write data is equal to a multiple of the logical block size, and adds patch data to the write data to make the amount of the write data equal to a multiple of the logical block size when the amount of the write data is not equal to a multiple of the logical block size.

6. The flash storage device as claimed in claim 1, wherein the storage units are pages of the flash memory.

7. The flash storage device as claimed in claim 6, wherein the controller determines the logical block size to be equal to a capacity of a page of the flash memory when the flash memory is a single-level-cell (SLC) flash memory, determines the logical block size to be equal to a capacity of two pages of the flash memory when the flash memory is a multi-level-cell (MLC) flash memory, and determines the logical block size to be equal to a capacity of three pages of the flash memory when the flash memory is a triple-level-cell (TLC) flash memory.

8. A data storage system, comprising:
a flash storage device, comprising a flash memory for data storage, and when the flash storage device receives a read capacity command from a host, determining a size of a logical block to be a specific multiple of a storage unit capacity of the flash memory, and sending information about the logical block size to the host in response to the read capacity command, wherein the specific multiple is a natural number, the flash memory comprises a plurality of storage units for data storage, and wherein the total capacity of each of the storage units is equal to the storage unit capacity; and
a host, sending the read capacity command to the flash storage device, retrieving the logical block size from the information, and sending only write data with an amount equal to a multiple of the logical block size to the flash storage device.

9. The data storage system as claimed in claim 8, wherein when the flash storage device receives the read capacity command from the host, the flash storage device further obtains information about a total capacity of the flash memory, divides the total capacity by the storage unit capacity to obtain a logical block number, and sends the logical block number to the host in addition to the logical block size, in response to the read capacity command.

10. The data storage system as claimed in claim 8, wherein before the host sends the write data, the host determines whether the amount of the write data is equal to a multiple of the logical block size, and adds patch data to the write data to make the amount of the write data equal to a multiple of the logical block size when the amount of the write data is not equal to a multiple of the logical block size.

11. The data storage system as claimed in claim 1, wherein when a first storage unit selected from the storage units has data stored therein, the flash memory cannot write data to the first storage unit until after data is removed from the first storage unit.

12. The data storage system as claimed in claim 8, wherein when the flash storage device receives the write data from the host, the flash storage device divides the write data into a plurality of storage unit segments with a total amount of data equal to the storage unit capacity, and writes the storage unit segments into the storage units of the flash memory.

13. The data storage system as claimed in claim 8, wherein the storage units are pages of the flash memory.

14. The data storage system as claimed in claim 13, wherein the flash storage device determines the logical block size to be equal to a capacity of a page of the flash memory when the flash memory is a single-level-cell (SLC) flash memory, determines the logical block size to be equal to a capacity of two pages of the flash memory when the flash memory is a multi-level-cell (MLC) flash memory, and determines the logical block size to be equal to a capacity of three pages of the flash memory when the flash memory is a triple-level-cell (TLC) flash memory.

15. A data writing method of a data storage system, wherein the data storage system comprises a host and a flash storage device, the flash storage device comprises a flash memory comprising a plurality of storage units for data storage, and the total capacity of each of the storage units is equal to a storage unit capacity, and the method comprises:
    sending, by the host, a read capacity command to the flash storage device;
    when the flash storage device receives the read capacity command from the host, determining, by the flash storage device, the size of a logical block to be a specific multiple of the storage unit capacity, wherein the specific multiple is a natural number;
    sending, by the flash storage device, information about the logical block size to the host in response to the read capacity command;
    after the host receives the information from the flash storage device, retrieving, by the host, the logical block size from the information; and
    sending, by the host, only write data with an amount equal to a multiple of the logical block size to the flash storage device.

16. The method as claimed in claim 15, wherein sending of the information comprises:
    obtaining, by the flash storage device, information about a total capacity of the flash memory;
    dividing, by the flash storage device, the total capacity by the storage unit capacity to obtain a logical block number; and
    sending, by the flash storage device, the logical block number to the host in addition to the logical block size, in response to the read capacity command.

17. The method as claimed in claim 15, wherein sending of the write data comprises:
    determining, by the host, whether the amount of the write data is equal to a multiple of the logical block size; and
    when the amount of the write data is not equal to a multiple of the logical block size, adding patch data to the write data to make the amount of the write data equal to a multiple of the logical block size.

18. The method as claimed in claim 15, wherein the method further comprises:
    when the flash storage device receives the write data from the host, dividing, by the flash storage device, the write data into a plurality of storage unit segments with a total amount of data equal to the storage unit capacity; and
    writing, by the flash storage device, the storage unit segments into the storage units of the flash memory.

19. The method as claimed in claim 15, wherein the storage units are pages of the flash memory.

20. The method as claimed in claim 19, wherein determination of the logical block size comprises:
    when the flash memory is a single-level-cell (SLC) flash memory, determining, by the flash storage device, the logical block size to be equal to a capacity of a page of the flash memory;
    when the flash memory is a multi-level-cell (MLC) flash memory, determining, by the flash storage device, the logical block size to be equal to a capacity of two pages of the flash memory; and
    when the flash memory is a triple-level-cell (TLC) flash memory, determining, by the flash storage device, the logical block size to be equal to a capacity of three pages of the flash memory.

* * * * *